(12) United States Patent
Armangau et al.

(10) Patent No.: US 10,852,993 B2
(45) Date of Patent: Dec. 1, 2020

(54) ADAPTIVE COMPRESSION MODE

(71) Applicant: EMC IP Holding Company LLC, Hopkinton, MA (US)

(72) Inventors: Philippe Armangau, Acton, MA (US); Sorin Faibish, Newton, MA (US); Daniel E. Cummins, Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 58 days.

(21) Appl. No.: 16/261,906

(22) Filed: Jan. 30, 2019

(65) Prior Publication Data

US 2020/0241805 A1 Jul. 30, 2020

(51) Int. Cl.
*G06F 12/00* (2006.01)
*G06F 3/06* (2006.01)

(52) U.S. Cl.
CPC .......... *G06F 3/0661* (2013.01); *G06F 3/0608* (2013.01); *G06F 3/0679* (2013.01)

(58) Field of Classification Search
None
See application file for complete search history.

(56) References Cited

U.S. PATENT DOCUMENTS

| 10,116,329 | B1* | 10/2018 | Bigman | H03M 7/60 |
| 2018/0052611 | A1* | 2/2018 | Guilford | G06F 3/0608 |
| 2018/0300087 | A1* | 10/2018 | Stiles | G06F 3/0685 |

OTHER PUBLICATIONS

Scharm, Comparison of Compression, Apr. 4, 2011, https://binfalse.de/2011/04/04/comparison-of-compression/ (Year: 2011).*
Sorin Faibish, et al., "Method for Maximum Data Reduction Combining Compression With Deduplication in Storage Arrays", U.S. Appl. No. 16/031,910, filed Jul. 10, 2018.

* cited by examiner

*Primary Examiner* — Jason W Blust
(74) *Attorney, Agent, or Firm* — Muirhead and Saturnelli, LLC

(57) ABSTRACT

Techniques for data processing may include: receiving, at a data storage system, a write operation that writes a data chunk; selecting, in accordance with one or more criteria related to load of at least one of the data storage system and the hardware device, a compression level to be used in connection with compressing the data chunk; issuing a request to a hardware device to perform compression processing that compresses the data chunk in accordance with the compression level selected and generates a compressed form of the data chunk; and storing the compressed form of the data chunk on a non-volatile storage device. The criteria may include any one or more of processor workload of the data storage system, write cache level, response time of the hardware device, and read load.

20 Claims, 9 Drawing Sheets

ADAPTIVE COMPRESSION MODE

BACKGROUND

Technical Field

This application generally relates to performing data compression and/or decompression operations.

Description of Related Art

Systems may include different resources used by one or more host processors. Resources and host processors in the system may be interconnected by one or more communication connections, such as network connections. These resources may include, for example, data storage devices such as those included in data storage systems. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of data processing comprising: receiving, at a data storage system, a write operation that writes a data chunk; selecting, in accordance with one or more criteria related to load of at least one of the data storage system and the hardware device, a compression level to be used in connection with compressing the data chunk; issuing a request to a hardware device to perform compression processing that compresses the data chunk in accordance with the compression level selected and generates a compressed form of the data chunk; and storing the compressed form of the data chunk on a non-volatile storage device. The one or more criteria may include processor load of the data storage system, and wherein the compression level may be selected from a plurality of defined compression levels corresponding to providing a plurality of corresponding expected levels of compressibility. The plurality of compression levels may have a first ranking denoting a relative ordering of the plurality of compression levels from a highest expected compressibility level to a lowest expected compressibility level. Each of the plurality of compression levels may be associated with one of a plurality of value ranges that indicates that said each compression level is selected when the processor load denotes a value in the one value range specified for said each compression level. One of the plurality of compression levels ranked in the first ranking as having the highest expected compressibility level may be selected when the processor load is included in a lowest one of the plurality of value ranges. Another one of the plurality of compression levels ranked in the first ranking as having the lowest expected compressibility level may be selected when the processor load is included in a highest one of the plurality of value ranges. The plurality of compression levels may have a second ranking denoting a relative ordering of the plurality of compression levels from a highest expected computational intensity to perform compression to a lowest expected computational intensity to perform compression. The one compression level ranked in the first ranking as having the highest expected compressibility level may also be ranked in the second ranking as having the highest expected computational intensity, and wherein another one of the plurality of compression levels ranked in the first ranking as having the lowest expected compressibility level may also be ranked in the second ranking as having the lowest expected computational intensity. The plurality of compression levels may have a third ranking denoting a relative ordering of the plurality of compression levels from a highest expected compression throughput to a lowest expected compression throughput. One of the plurality of compression levels ranked in the first ranking as having the highest expected compressibility level and ranked in the second ranking as having the highest expected computational intensity may also be ranked in the third ranking as having the lowest expected compression throughput. Another one of the plurality of compression levels ranked in the first ranking as having the lowest expected compressibility level and ranked in the second ranking as having the lowest expected computational intensity may also be ranked in the third ranking as having the highest expected compression throughput. The processor load may be measured as processor utilization. The hardware device may include at least one processor used to compress and decompress data provided as an input to the hardware device. The hardware device may include hardware accelerators to compress and decompress data provided as an input to the hardware device. The processor load of the data storage system may be determined with respect to one or more processors of the data storage system. At least one processor of the hardware device may be a co-processor used to offload compression and decompression processing from the one or more processors of the data storage system. The co-processor may performs the compression processing that compresses the data chunk in accordance with the compression level selected and generates a compressed form of the data chunk. The compression processing that compresses the data chunk in accordance with the compression level selected and generates a compressed form of the data chunk may be performed inline as part of I/O path processing when writing the data chunk. Alternatively, the compression processing that compresses the data chunk in accordance with the compression level selected and generates a compressed form of the data chunk may not be performed inline as part of I/O path processing when writing the data chunk. The method may include determining whether a current read load is above a first specified threshold, whether measured throughput of the hardware device is below a second specified threshold, and whether the compression level selected has an associated expected compression throughput that exceeds a third specified threshold; and responsive to determining the current read load is above a first specified threshold, the measured throughput of the hardware device is below a second specified threshold, and the compression level selected has an associated expected compression throughput that exceeds a third specified threshold, performing processing that reduces a current rate at which decompressed data is sent to the hardware device for decompressing. The one or more criteria may include one or more factors related to load of the hardware device. The one or more criteria may include write cache level, response time of the hardware device, and read load.

In accordance with another aspect of techniques herein is a system comprising: at least one processor; and a memory comprising code stored thereon that, when executed, performs a method of data processing comprising: receiving, at a data storage system, a write operation that writes a data chunk; selecting, in accordance with one or more criteria related to load of at least one of the data storage system and the hardware device, a compression level to be used in connection with compressing the data chunk; issuing a request to a hardware device to perform compression processing that compresses the data chunk in accordance with the compression level selected and generates a compressed form of the data chunk; and storing the compressed form of the data chunk on a non-volatile storage device.

In accordance with another aspect of techniques herein is a computer readable medium comprising code stored thereon that, when executed, performs a method of data processing comprising: receiving, at a data storage system, a write operation that writes a data chunk; selecting, in accordance with one or more criteria related to load of at least one of the data storage system and the hardware device, a compression level to be used in connection with compressing the data chunk; issuing a request to a hardware device to perform compression processing that compresses the data chunk in accordance with the compression level selected and generates a compressed form of the data chunk; and storing the compressed form of the data chunk on a non-volatile storage device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
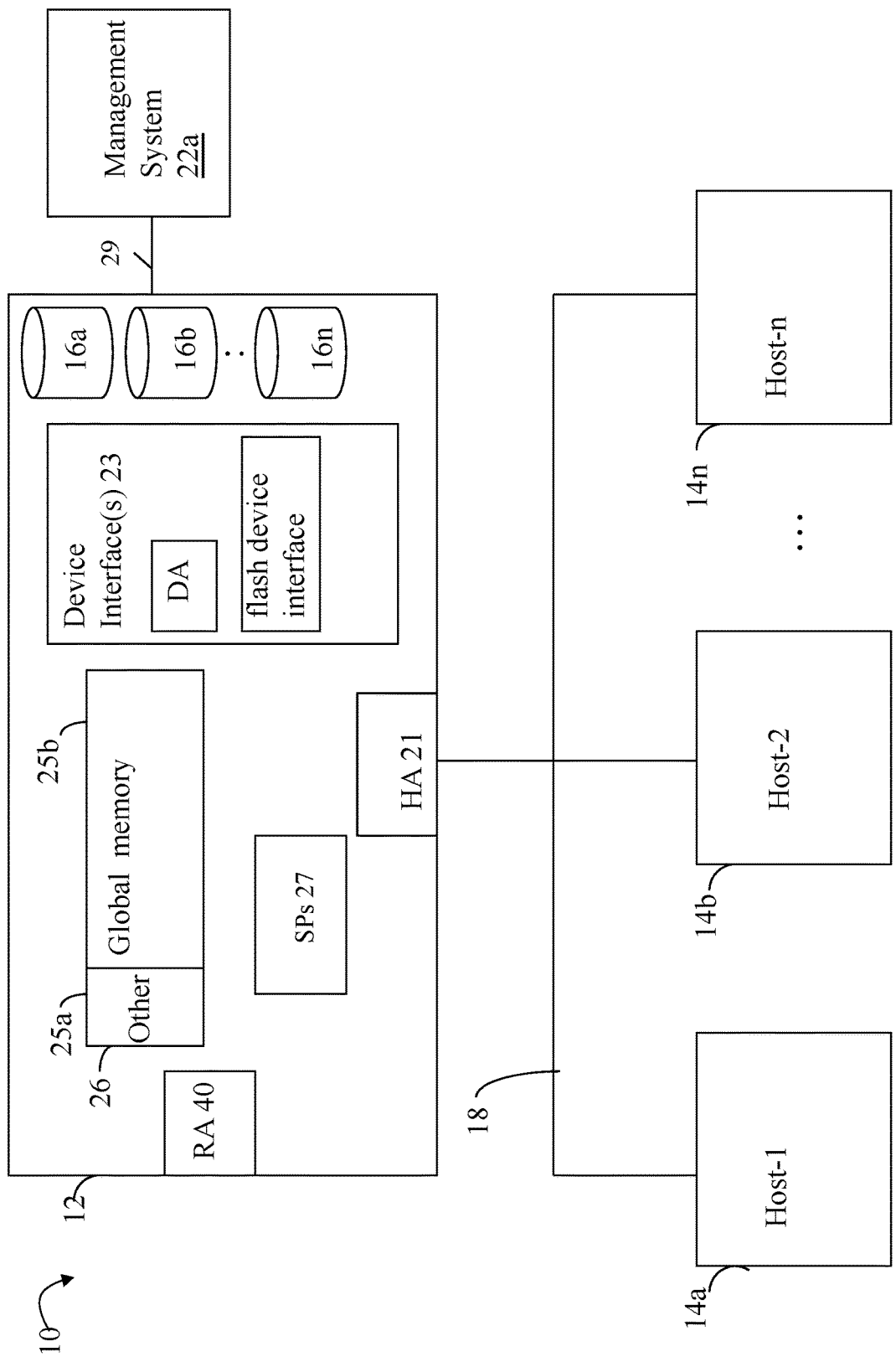
FIGS. 1 and 3 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSD may refer to solid state electronics devices as distinguished from electromechanical devices, such as hard drives, having moving parts. Flash devices or flash memory-based SSDs are one type of SSD that contains no moving mechanical parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Generally, techniques herein may be used in connection with any suitable storage system, appliance, device, and the like, in which data is stored.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate data chunks whereby only a single instance of the data chunk is retained (stored on physical storage) and where pointers or references may be used in connection with duplicate or redundant copies (which reference or identify the single stored instance of the data chunk).

Figure 2:
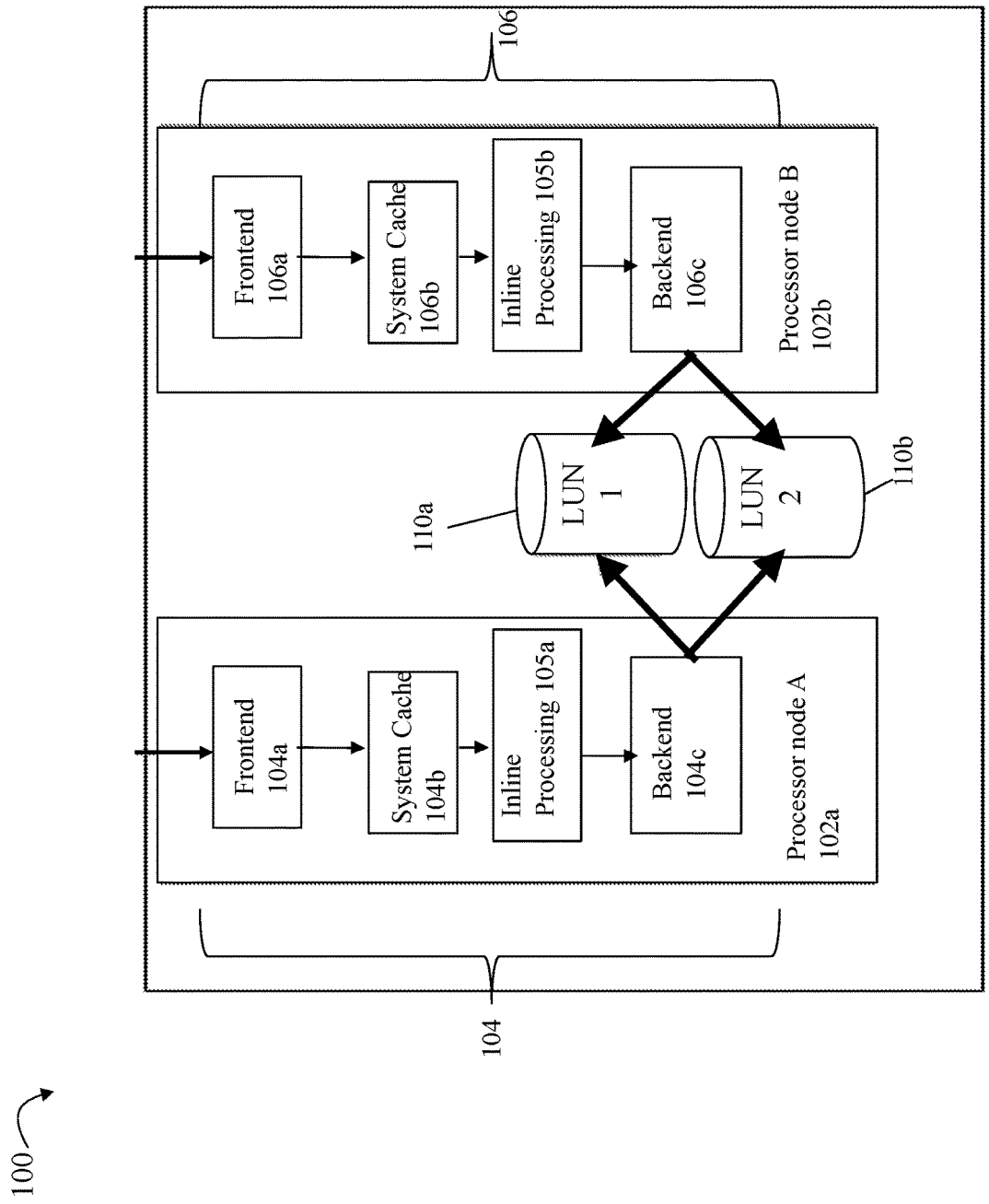
FIG. 2 is an example illustrating components and associated data flow as may be performed in connection with the I/O path or data path in an embodiment in accordance with techniques herein.

Referring to FIG. 2, shown is an example 100 illustrating components that may be included in the data path in at least one existing data storage system in accordance with techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b, inline processing may be performed by layer 105a. Such inline processing operations of 105a may be optionally performed and may include any one of more data processing operations in connection with data that is flushed from system cache layer 104b to back-end non-volatile physical storage 110a, 110b, as well as when retrieving data from back-end non-volatile physical storage 110a, 110b to be stored in system cache layer 104b. In at least one embodiment, the inline processing may include performing compression and/or data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. Elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned the host (e.g., by component 104a). At various points in time, WP data stored in the system cache is flushed or written out to physical storage 110a, 110b. In connection with inline processing layer 105a, prior to storing the original data on physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a chunk) of the original data is a duplicate of an existing data portion already stored on 110a, 110b, that particular portion of the original data is not stored in a compressed form and may rather be stored in its deduplicated form (e.g., there is no need for compression of a chunk determined to be duplicate of another existing chunk). If the original data portion is not a duplicate of an existing portion already stored on 110a, 110b, the original data portion may be compressed and stored in its compressed form on 110a, 110b.

In connection with a read operation to read a chunk of data, a determination is made as to whether the requested read data chunk is stored in its original form (in system cache 104b or on physical storage 110a, 110b), or whether the requested read data chunk was previously deduplicated or compressed. If the requested read data chunk (which is stored in its original decompressed, non-deduplicated form) is in system cache, the read data chunk is retrieved from the system cache 104b and returned to the host. Otherwise, if the requested read data chunk is not in system cache 104b but is stored on physical storage 110a, 110b in its original form, the requested data chunk is read by the BE component 104c from the backend storage 110a, 110b, stored in the system cache and then returned to the host.

If the requested read data chunk was previously deduplicated, the read data chunk is recreated and stored in the system cache in its original form so that it can be returned to the host. If the requested read data chunk was previously compressed, the chunk is first decompressed prior to sending the read data chunk to the host. If the compressed read data chunk is already stored in the system cache, the data is uncompressed to a temporary or buffer location, the uncompressed data is sent to the host, and the buffer or temporary location is released. If the compressed read data chunk is not in system cache but stored on physical storage 110a, 110b, the compressed read data chunk may be read from physical storage 110a, 110b into system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In connection with techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. Processor cache is substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage.

When the processor of the data storage system performs processing, such as in connection with inline processing 105a, 105b as noted above, data may be loaded from main memory and/or other lower cache levels into its CPU cache. In particular, inline compression (ILC) and inline data deduplication (ILD) may be performed as part of inline processing 105a, 105b. In at least one embodiment, the size of a data portion or chunk processed by ILC and ILD may be 256 bytes. The data chunks processed may be included in a data set. Generally, a data set may be any defined set of stored data such as, for example, a database, one or more selected portions or logical address space portions of a database, data used by a particular application stored on one or more LUNs, selected portions of one or more LUNs, one or more files, one or more directories, one or more file systems, particular portions of one or more directories or file systems, and the like.

As described herein, data storage systems may perform data services such as, for example, compression/decompression of data as part of ILC processing. One option is to provide one or more such data services using a software-based implementation where code is executed using processors or CPUs of the data storage system, for example, to perform any desired compression and decompression with respect to data stored on the data storage system. Compression/decompression processing such as performed by ILC threads is generally a CPU intensive operation. Thus a software-based implementation of compression/decompression executing on a CPU of the data storage system may consume an undesirable amount of CPU time that adversely affects overall data storage system performance. For example, the foregoing may result in unacceptably low performance of I/O processing since available processor or CPU execution time is allocated to servicing I/O operations along with the additional processing for performing compression/decompression, which can be computational expensive.

As such, described in following paragraphs are techniques that provide a more cost-effective and flexible approach to perform compression and decompression using another hardware (HW) device. In at least one embodiment, the HW device may include one or more processors, memory and other components that provides one or more data operations or services, such as part of the I/O data path or runtime stack with respect to data stored on PDs of the data storage system. For example, the HW device may perform compression, decompression and optionally one or more other specified operations or data-related services. The HW device may be used to off-load processing (e.g., from the one or more data storage system CPUs to the co-processors of the HW device) performed in connection with compression and decompression of data stored on PDs of the data storage system. In one aspect, the HW device may be characterized as having a special or designated purpose to perform only the specified data related services, such as only compression/decompression. For example, in at least one embodiment, the HW device may only perform processing for compression/decompression and data deduplication data services. Generally, the HW device is connected to at least one CPU of the data storage system. For example, the HW device may be a chipset on a plug-in card that connects to a CPU of the data storage system. As another example, the HW device may be implemented as a SoC (system on a chip) and connect to a CPU of the data storage system via on-chip interconnections. In at least one embodiment, the data storage system may utilize an x86 instruction set architecture (ISA) for microprocessors from Intel Corporation, and the HW device may be Intel® QuickAssist Technology (Intel® QAT) hardware that includes hardware-based accelerators that perform compression and decompression processing, such as in connection with ILC processing. It should be noted that techniques herein may be used in connection with ILC processing and also data compression/decompression processing, where compression and/or decompression are not performed as part of the I/O path.

The Intel® QAT hardware, or more generally HW device, may support multiple compression levels that provide varying compression rates and varying execution times. For example, lower compression levels may indicate a request for faster compression at the expense of typically obtaining lower compression ratios. Higher compression levels may indicate a request for higher compression ratios at the expense of higher execution times. One or more APIs (application programming interfaces) may be used in connection with communicating with the HW device, such as the Intel® QAT hardware, to request compression or decompression processing of data, specify a particular compression level to use in connection with performing data compression, and the like. A compression ratio may denote a measure of the size of an original uncompressed data chunk with respect to the size of the compressed form of the data chunk. For example, if compression processing compresses a 10 MB file to 2 MB, the file has a compression ratio of 10/2=5, often notated as an explicit ratio, 5:1 (read "five" to "one"), or as an implicit ratio, 5/1.

Techniques in following paragraphs provide for an adaptive compression level or mode that may be dynamically selected in accordance with one or more criteria related to a current state of the data storage system and/or the HW device. For example, the compression level or mode may be selected in accordance with the workload of the CPU connected to the HW device. The compression level or mode may also be selected in accordance with the workload of the HW device. The criteria used to assess the workload of the HW device may be based generally on one or more factors, such as, for example, any of the read workload as related to decompression requests, write cache fullness/level (e.g., as related to compression requests), and/or HW device response time (RT). The foregoing and other aspects of techniques herein are described in more detail in following paragraphs.

Figure 3:
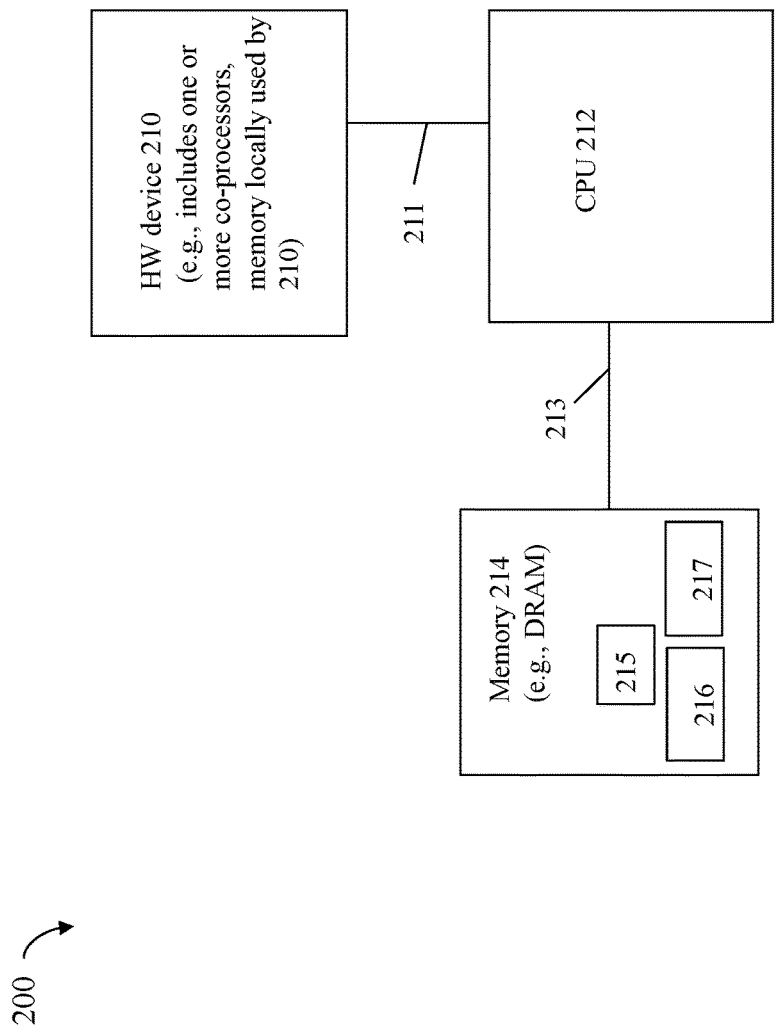

Referring to FIG. 3, shown is an example of components that may be included in an embodiment in accordance with techniques herein. The example 200 includes HW device 210, CPU 212 and memory 214. The HW device 210 may be, for example, Intel® QAT hardware as described herein.

The CPU 212 may be, for example, a data storage system processor in accordance with the x86 ISA. The memory 214 may be, for example DRAM used as a portion of cache memory of the data storage system. Element 211 is a connection between the HW device 210 and the CPU 212 and used for communications therebetween. Element 213 is a connection between the HW device 210 and the memory 214 and used for communications therebetween.

In at least one embodiment in accordance with techniques herein, an application executing on the data storage system allocates a portion 215 of memory 214 and stores the data to be compressed or decompressed in the allocated memory portion 215 of 214. The application may then subsequently invoke an API, such as included in the Intel® QAT API. The data in memory portion 215 may, for example, be included as an input parameter, along with other specified parameters, of the API. Based on the input parameters of the API, upon invocation the API may create a request descriptor containing all the information required by the HW device to perform the requested operation of compression or decompression, and the API may write the request descriptor into a location 216 in memory 214. The request descriptor may, for example, identify the address or location of 215 in memory. The HW device 210 fetches the data from 215 and the request from 216. In at least one embodiment, the HW device 210 may perform DMA operation(s) to access 215 and 216 of memory 214 and obtain, respectively, the data and the request descriptor as inputs for processing, such as compression or decompression. The HW device 210 may store the input including the data and request descriptor in a buffer or memory of the HW device 210 that is locally used only by the HW device 210. After performing the requested processing operation of compression or decompression, the HW device 210 may perform DMA operation(s) to store the resulting transformed data in the portion 215 and store an output or response descriptor in portion 217 of memory 214. The response descriptor may, for example, identify the address or location of 217 in memory 214.

The HW device 210 may be informed regarding the pending request descriptor of 215 in any suitable manner. For example, the HW device 210 may be signaled via interrupt that there is a pending request descriptor of 215. In a similar manner, the CPU 212 may be notified regarding the resulting transformed data stored in 216 and the response descriptor of 217 in any suitable manner. For example, the CPU 212 may be signaled via interrupt that there is a pending response descriptor of 217. Alternatively, processing may be performed to poll 217 to check whether the response descriptor has been written to 217. Additionally, the API may support asynchronous calls and/or synchronous calls. As known in the art, with synchronous calls, the invoking code waits inline for the requested operation made via the API call to complete, whereby the API returns the transformed data to the invoking code, before continuing with other subsequent processing in the invoking code. As known in the art, for asynchronous calls, the invoking code performs the API call and continues processing and executing its own code without waiting for the requested processing to complete. At a later point in time, once processing of the request made via the API call has completed, the invoking code is signaled or interrupted that the requested operation has completed and the invoked code may then obtain the transformed data resulting from the processing. For example, responsive to the response descriptor and transformed data results being stored in memory 214, a callback routine within the invoking code may be signaled to access the transformed data and perform any desired post processing. Once the callback has completed, execution control may return to the point in the invoking code that was executing at the time of the interrupt. In at least one embodiment in accordance with techniques herein, the API calls made, such as to perform compression and decompression, may be asynchronous calls.

As described herein in at least one embodiment, the HW device 210 may be the Intel® QAT hardware where an embodiment may use the associated Intel® QATAPI in connection with techniques herein. However, more generally, the HW device 210 may include any suitable component(s) (e.g., co-processors, local memory to 210, etc.) capable of performing the offloading processing of compression and decompression as described herein. Thus, although reference may be made in particular examples to the Intel® QAT hardware and Intel® QAT API, more generally, any suitable HW device 210 and any suitable API or other technique may be used in connection with techniques described herein.

Additionally, it should be noted that although only a single CPU 212 and its associated memory 214 and connection 213 are illustrated in FIG. 3, an embodiment in accordance with techniques herein may have multiple instances of the foregoing (e.g., multiple CPUs connected to the HW device 210 rather than just 1 CPU as in FIG. 3) where multiple CPUs may be connected to, and issue requests to, the HW device 210.

As mentioned above, the Intel® QAT hardware, or more generally HW device 210, may support multiple compression levels that provide varying compression rates and varying execution times. For example, in at least one embodiment, the HW device 210 may support four (4) different compression levels as will now be described with reference to FIG. 4.

Figure 4:
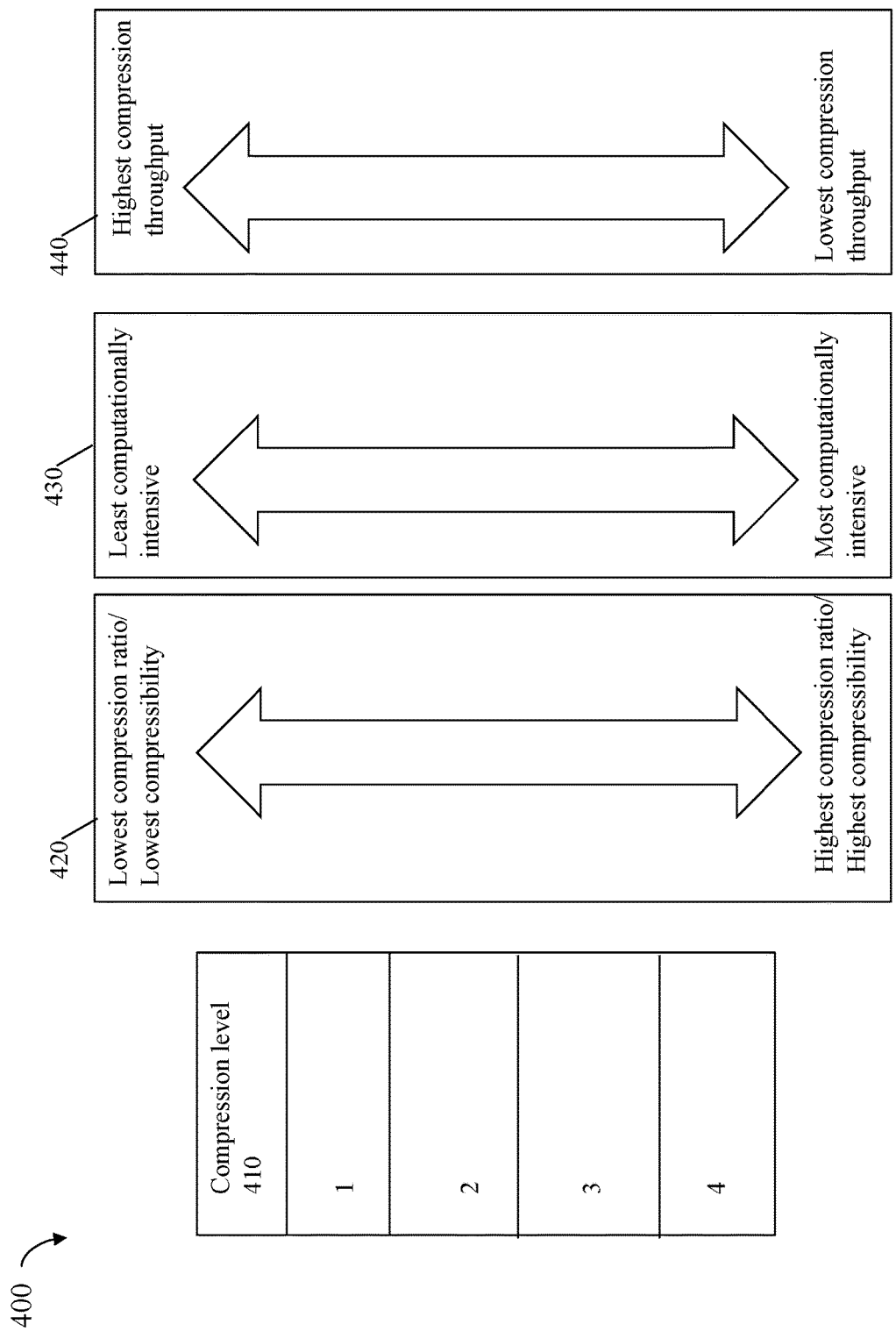
FIG. 4 is an example illustrating a table of CPU utilizations and selected compression levels in an embodiment in accordance with techniques herein.

Referring to FIG. 4, shown is an example of supported compression levels and associated characteristics in an embodiment in accordance with techniques herein. The example 300 of FIG. 4 includes a list 410 of the 4 compression levels that may be supported in an embodiment in accordance with techniques herein. Using an API as discussed above, any one of the 4 compression levels may be specified in connection with compressing a particular data chunk. Although 4 compression levels are illustrated in 410, more generally, any embodiment may include any suitable number of compression levels. As may be desired, the particular compression level specified when making a request via the API for each different data chunk may vary or change over time. In at least one embodiment, the compression level actually specified in the API or request may differ from the compression level used by the HW device. For example, in at least one embodiment, the API may define an input parameter that is one of 9 predefined compression levels whereby each of the 9 predefined compression levels of the API may be mapped to one of the 4 compression levels of 410 actually used by the HW device. The foregoing mapping may be provided, for example, for reasons of compatibility with different versions of the API and/or different HW device compression levels that may change or vary over time.

The example 400 illustrates characteristics regarding the different relative results expected to be achieved for the different compression levels with respect to compressibility or compression ratio (420), computation intensiveness (e.g., execution time elapsed in perform the desired compression) (430), and compression throughput (440) with respect to the HW device. As denoted by 420, the compression levels may be ranked in terms of their relative achieved compression ratio or compressibility from 1 (lowest compression ratio or compressibility) to 4 (highest compression ratio or compressibility). Thus, for the same data block with respect to the 4 compression levels 410, compression level 4 is expected to achieve the smallest compressed size and compression level 1 is expected to achieve the largest compressed size.

As denoted by 430, the compression levels may be ranked in terms of their relative computational intensity from 1 (lowest or least computation) to 4 (highest computational intensity). Generally, for the same data block, compression level 4 takes the longest or has the largest execution time to compute the compressed form of the data block of all 4 compression levels. In a similar manner, for the same data block compression level 1 takes the smallest or least execution time to compute the compressed form of the data block of all 4 compression levels.

As denoted by 440, the compression levels may be ranked in terms of their relative compression throughput, with respect to the HW device, from 1 (highest compression throughput) to 4 (lowest compression throughput). Generally, for the same data block, compression level 1 has the highest compression throughput of all 4 compression levels. In a similar manner, for the same data block compression level 1 has the lowest compression throughput of all 4 compression levels. For example, in at least one embodiment, compression throughput of the HW device may be computed as the amount of uncompressed data divided by the elapsed time taken to compress the uncompressed data. In such an embodiment, the following compression throughput levels may be expected: approximately 100 GBs/second for compression levels 1 and 2; approximately 60 GBs/second for compression level 3; and approximately 30 GBs/second for compression level 4. It should be noted that the foregoing and other expected levels or values as generally used herein may be approximate within any suitable specified thresholds or tolerance levels. Additionally, decompression throughput of the HW device may be computed as the amount of compressed data divided by the elapsed time taken to decompress the compressed data. Overall throughput observed for HW device may be computed as a combination of both the observed amount of data processed (collectively both for compression and decompression) divided by the elapsed time to perform the request processing of such data on the HW device.

In at least one embodiment, each of the 4 compression levels of 210 may implement one of the LZ compression algorithms using a window size selected in accordance with the specified compression level. As generally known in the art, LZ compression repeatedly searches an input for substrings that are the same. The matching substrings may then all be replaced by the same single token or character. In other words, each occurrence of the substring in the input is replaced by the same character. One parameter that can be varied is the window size denoting the size or length of the substring. Using larger size or lengths of the window size generally achieves a higher rate of compressibility. Thus, in at least one embodiment with reference to the 4 compression levels 210 of FIG. 4, compression level 1 may use the smallest window size of all 4 compression levels, and compression level 4 may use the largest window size of all 4 compression levels.

As can be seen from the example 400, the more computationally expensive or intensive the compression level, the better the expected compression ratio and the lower the expected compression throughput. Furthermore, in connection with ILC, the higher the compression throughput of the HW device 210, the lower the expected I/O latency (e.g., lower the amount of elapsed time expected to perform the desired compression consistent with 430). Lower compression level numbers indicate a request for faster compression of a data block at the expense of obtaining a lower compression ratio. Higher compression level numbers indicate a request for higher compression ratios at the expense of slower execution time (e.g., get compressed data block results slower than if using a relatively lower compression level).

In at least one embodiment in accordance with techniques herein, compression processing may be performed using a compression level selected in accordance with existing workload of the data storage system. For example, the selection of a compression level may be made with respect to the existing workload of the CPU 212 of the data storage system. Generally, the CPU load may be made with respect to one or more "cores" of the CPU 212 of the data storage system. For example, as discussed below, the CPU load may be with respect to the CPU that issues the compression request to the HW device. If the CPU load is high thereby indicating that the CPU is busy, a lower compression level may be specified. In at least one embodiment, the compression level selected may be in accordance with CPU or processor utilization. For example, CPU utilization may be a percentage metric from 0-100%, wherein 0% denotes an idle processor and 100% denotes complete of full processor utilization all the time. Thus, if the CPU utilization is high thereby indicating that the CPU is busy, a lower compression level may be specified (e.g., don't want to delay further servicing the I/O or increase I/O latency while waiting additional time for compression of a data block to complete). Generally, if the CPU utilization is high it means that the CPU is processing a high level of I/O operations and I/O workload. In this case, it is desirable to also have a compatible high level of compression throughput so as not to further delay servicing an I/O whose data is compressed. If, for example, a compression level of 4 is used, the CPU will have to wait longer to obtain the compressed result than if a lower compression level is used.

Figure 5A:
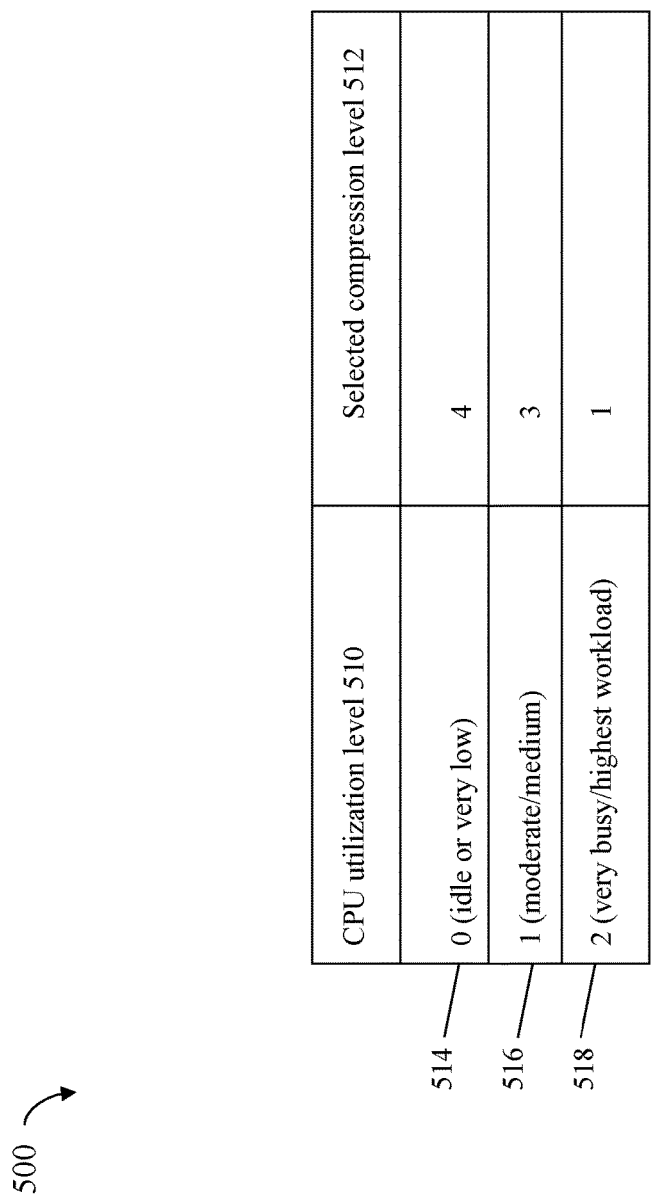
FIG. 5A is an example illustrating compression levels and characteristics in an embodiment in accordance with techniques herein.

Referring to FIG. 5A, shown is an example 500 of compression levels of FIG. 4 that may be selected in accordance with different CPU utilization levels in an embodiment in accordance with techniques herein. The example 500 includes a table with a first column CPU utilization level 510 and a second column selected compression level 512. Each row of the table indicates a selected compression level in column 512 for a particular observed CPU utilization level 510. Row 514 indicates that for a CPU utilization level of 0 denoting an idle or very low utilization level, the selected compression level may be 4. Row 516 indicates that for a CPU utilization level of 1 denoting a moderate or medium utilization level, the selected compression level may be 3. Row 518 indicates that for a CPU utilization level of 2 denoting very busy or the highest possible CPU utilization level, the selected compression level may be 1.

In at least one embodiment, threshold levels of CPU utilization may be defined for each of the CPU utilizations of 510. For example, in at least one embodiment, the CPU utilization level 0 denote a measured CPU utilization less than a first threshold such as 70%; the CPU utilization level 1 denote a measured CPU utilization less than a second threshold such as 80% and the CPU utilization level 2 denote a measured CPU utilization less than a third threshold such as 90%. Generally, an embodiment may use any number of CPU utilization levels and is not limited to 3 as in FIG. 5A.

A embodiment may select the number of CPU utilization levels in accordance with the number of compression levels used by the HW device 110. Additionally, an embodiment may use any suitable thresholds or ranges of values with the different CPU utilization levels.

The foregoing describes using CPU or processor load, such as CPU utilization, in connection with selecting a compression level. The CPU or processor load, such as indicated by CPU utilization, may be generally characterized as included in one or more criteria used in connection with selecting a particular compression level used in connection with compression processing of a data chunk at a particular point in time. Described in following paragraphs and with reference to FIG. 5B are examples of additional and/or different criteria that may be used in connection with selecting a particular compression level used in connection with compression processing of a data chunk at a particular point in time.

Figure 5B:
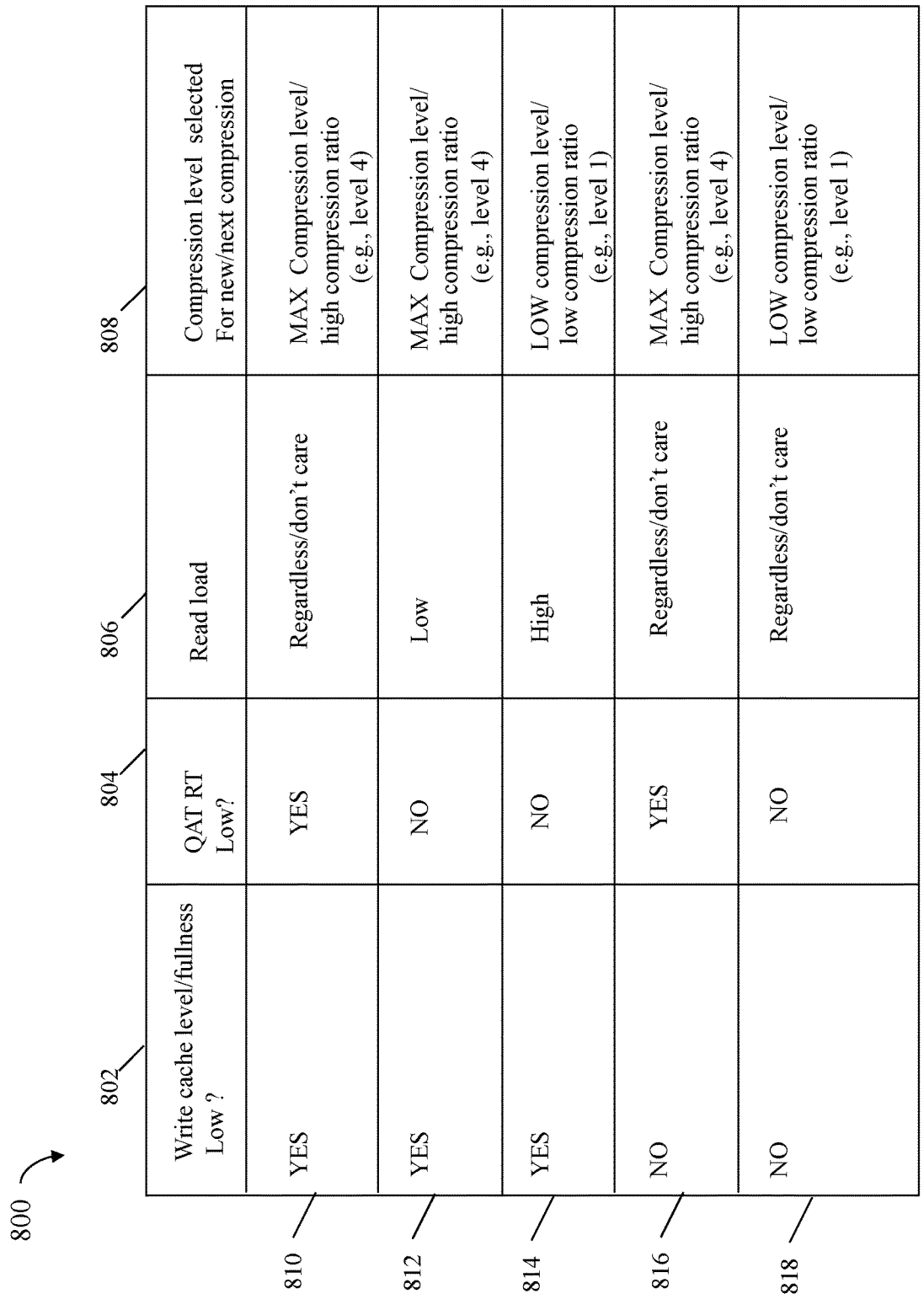
FIG. 5B is an example illustrating a table of compression levels that may be selected in accordance with hardware device transaction level, hardware device response time, and read load in an embodiment in accordance with techniques herein.

Referring to FIG. 5B, shown is an example 800 illustrating a table of compression levels that may be selected in accordance with write cache fullness or level, hardware device response time, and read load in an embodiment in accordance with techniques herein. The table 800 include the following columns: the first column 802 is a binary value indicating whether the write cache fullness or level is low; the second column 804 is a binary value indicating whether the QAT (or more generally HW device) RT is low; the third column 806 indicating the read I/O load or rate at which data is sent to the HW device for decompression; and the fourth column 808 indicating the compression level that may be selected for a new or next desired compression. Each row of the table 800 specifies particular settings or conditions for values in columns 802, 804 and 806 for selecting a particular compression level denoted by column 808 of the same row. In at least one embodiment in accordance with techniques herein, columns 802, 804 and 806 may denote criteria used in connection with selecting a particular compression level 808 for use in compressing a data chunk at a point in time.

In at least one embodiment, a write cache fullness or level of 802 may be low if the current level of write cache (e.g., on the data storage system) utilized or consumed is below a specified threshold level. Generally, the current level of the write cache fullness or utilization is an indicator regarding the write workload and thus an indicator of the amount of compression workload and compression-related requests sent to the HW device, such as the QAT hardware. The write cache level or fullness may be expressed using any suitable metric, such as a numeric quantity denoting an amount of write cache consumed or use, a percentage denoting a percentage of the overall write cache consumed, and the like. In at least one embodiment, a QAT RT (e.g., HW device RT) of 804 may be idle or very low if the measured RT of the QAT hardware (e.g., for both compression and decompression requests) to generate an output for a given input is below specified threshold level. In at least one embodiment, a read load or workload of 806 that is high/busy or low/idle may be as described elsewhere herein. For example, a read load of 806 may be deemed high if an observed read I/O workload in terms of requests or throughput (e.g., GBs/second) as related to decompression requests sent to the QAT hardware (e.g., HW device) is above a specified first threshold, and may be deemed low if an observed read I/O workload in terms of requests or throughput (e.g., GBs/second) as related to decompression requests sent to the QAT hardware (e.g., HW device) is below a specified second threshold.

Row 810 indicates that if the write cache fullness or level is low (YES), the QAT RT is low (YES), and independent of, or regardless of, the read load, the highest or maximum compression level may be selected thereby expected to provide the highest compression ratio with respect to all supported compression levels. For example, if conditions of row 810 exist, the selected compression level may be 4.

Row 812 indicates that if the write cache fullness or level is low (YES), the QAT RT is not low (NO), and the read load is low, the highest or maximum compression level may be selected thereby expected to provide the highest compression ratio with respect to all supported compression levels. For example, if conditions of row 812 exist, the selected compression level may be 4.

Row 814 indicates that if the write cache fullness or level is low (YES), the QAT RT is not low (NO), and the read load is high, the lowest or minimum compression level may be selected thereby expected to provide the lowest or minimum compression ratio with respect to all supported compression levels. For example, if conditions of row 814 exist, the selected compression level may be 1.

Row 816 indicates that if the write cache fullness or level is not low (NO), the QAT RT is low (YES), and independent of, or regardless of, the read load, the highest or maximum compression level may be selected thereby expected to provide the highest compression ratio with respect to all supported compression levels. For example, if conditions of row 816 exist, the selected compression level may be 4.

Row 818 indicates that if the write cache fullness or level is not low (NO), the QAT RT is not low (NO), and independent of, or regardless of, the read load, the lowest or minimum compression level may be selected thereby expected to provide the lowest or minimum compression ratio with respect to all supported compression levels. For example, if conditions of row 816 exist, the selected compression level may be 1.

In an embodiment in accordance with techniques herein, compression and decompression processing as may otherwise be performed using a CPU of the data storage system is offloaded from the data storage system to the HW device, where a coprocessor of the HW device performs compression and decompression processing. Thus, techniques herein increase the availability of the CPU resource 212 of the data storage system to perform other processing (e.g., besides compression and decompression processing) for servicing I/O operations. In at least one embodiment, the I/O or data path for writing data destaged from cache may always perform compression processing independent of whether or not the data being destaged is compressible (e.g., independent of whether the compressed form results in achieving at least a minimum compression ratio) due to the reduction in CPU resource contention achieved by offloading compression processing to the HW device. In at least one embodiment, the decompression throughput of 100 GBs/second may be obtained when performing decompression such as in connection with reads whereby the decompression throughput may be approximately the same independent of the specified compression level used to previously compress the data. In at least one embodiment, decompression processing of a compressed data block may automatically detect the particular compression level used previously to compress that data block based on the compressed form of the data.

In at least one embodiment where the compression throughput with respect to processing by the HW device is expected to be approximately (e.g., within specified tolerance or threshold) the same for multiple compression levels, an embodiment may choose to select the compression level expected to achieve the highest compression ratio. For example, as noted above, compression levels 1 and 2 of 410 may be expected to both achieve approximately the same compression throughput of 100 GBs/second. Selecting the compression level of 2 may result in a smaller compressed size that compression level while obtaining the same compression throughput (e.g., no additional I/O latency due to compressing at level 2 rather than at level 2).

Consistent with discussion herein, the HW device 210 may be used to perform both compression and decompression. Compression may be performed as part of ILC processing when writing data. Decompression may be performed as part of ILC processing when reading compressed data. In this case, as described herein, processing in an embodiment in accordance with techniques herein may also take into account the read load when selecting a compression level for the HW device. Generally, if the system is performing a large amount of reads (e.g., high read workload) and thus more data decompressions, the HW device as a resource may be in contention with availability to perform compression in connection with writes. In connection with performing both compression and decompression processing, the HW device 210 may become overloaded. For example, in at least one embodiment, it may not be possible for the HW device 210 to sustain achieving both the expected compression throughput and expected decompression throughput simultaneously. If the overloading of the HW device is caused by a heavy read workload, and thus a heavy decompression workload, that adversely impacts the ability of the HW device to perform compression processing (e.g., lower than expected compression throughput), processing may be performed to reduce the requests or rate of requests for decompression issued to the HW device 210 by the CPU 212. In this manner, compression processing of writes/write data may be given a higher priority than decompression processing of reads/read data in the case where the HW device is overloaded. For example, processing may be performed to determine whether the following 3 conditions are tree:

1) whether the compression level is currently set at 1 or 2 (e.g., one of the lowest levels having one of the highest compression throughputs) due to high CPU utilization;

2) whether the read load is high, such as above a first specified threshold; and 3) whether the measured or observed overall throughput (for both compression and decompression) of the HW device is low, such as below a second specified threshold (e.g., thus indicating an overloaded state or condition of the HW device).

The above-noted second specified threshold in connection with item or condition 3) may be determined based on the compression throughput expected for the compression level of 1 or 2 (e.g., highest compression throughput expected for any of the compression levels). For example, as mentioned elsewhere herein, the expected decompression throughput and also the expected compression throughput for each of compression levels 1 and 2 may be approximately 100 GBs/second. In at least one embodiment, the second specified threshold may be selected as 100 GBs/second. As a variation, the second specified threshold may be selected as a value less than 100 GBs/second, such as a suitable or acceptable overall throughput level for the HW device.

In connection with the above condition or item 2), the read load may be measured in any suitable manner using any suitable metric. For example, an embodiment may measure the read load based on a read rate or rate at which read data is requested per unit of time, such as GBs/second. For example, an embodiment may measure the rate at which read data is requested per unit of time with respect to decompression requests sent from the CPU 212 to the HW device 210. More generally, an embodiment may measure the rate at which read miss data is requested. As known in the art, a read hit occurs when the read data request is already in cache and the cached copy of the read data is returned to the client, such as a host. As also known in the art, a read miss alternatively occurs when the requested read data is not in cache and thus servicing the read includes reading the read data from the PDs of the backend non-volatile storage (e.g., such as by a DA), placing the read data in cache (e.g., such as by the DA), and returning the cached copy of the read data to the client (e.g., HA or FA reads the read data from cache and returns the read data to the client). Additionally, the above-noted first specified threshold may be any suitable read load threshold denoting a heavy read load.

The above-noted item or condition 1) indicates that the current compression level may be set to 1 or 2 thereby generally denoting the highest ranked 2 compression levels in terms of associated expected compression throughput. More generally, the compression level(s) designated by condition 1 may have an associated expected compression throughput that exceeds a third specified threshold.

Condition or item 1) above sets the compression level at 1 or 2 due to high CPU utilization denoting that a high compression throughput is desired. However, the desired high compression throughput of 100 GBs/second, for example, may not be obtained or observed if there is a high read workload present (as denoted by condition or item 2) and the measured or observed overall throughput of the HW device is low (e.g., below the second specified threshold).

In at least one embodiment, responsive to determining the combination of conditions or items 1-3 above are all true, processing may be performed to reduce the read I/O load or rate at which data is sent to the HW device for decompression. Thus compression processing as performed by the HW device in connection with writes may be given a higher priority than decompression processing as performed by the HW device in connection with reads (e.g., read misses for ILC or inline processing as part of the read data path) write processing. For example, in at least one embodiment, such processing may artificially reduce the rate at which compressed read data is sent to the HW device for decompression or reduce the rate at which requests for decompression of data are sent to the HW device (e.g., interjecting a time delay between such requests, ensuring that no more than a maximum number of decompression requests per specified time period are sent to the HW device, ensuring that no more than a maximum amount of data specified time period is sent to the HW device for decompression).

Figure 6A:
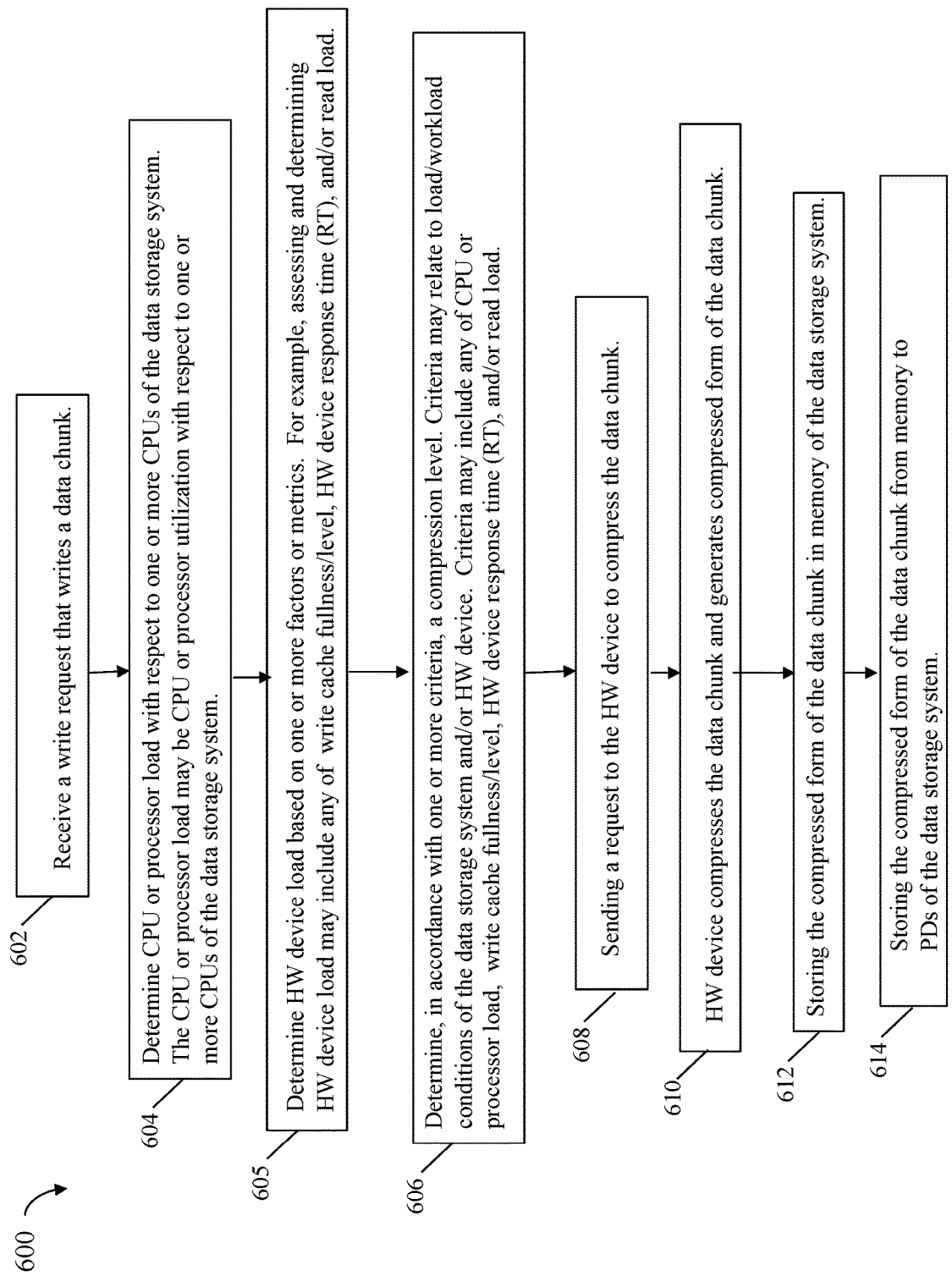
FIGS. 6A, 6B and 7 are flowcharts of processing steps that may be performed in an embodiment in accordance with techniques herein.

Referring to FIG. 6A, shown is a first flowchart 600 of processing steps that may be performed in an embodiment in accordance with techniques herein. In at least one embodiment, the steps of 600 may be performed as part the I/O path or data path, such as part of ILC processing. At step 602, a write request may be received that writes a data chunk From step 602, control proceeds to step 604. At step 604, processing is performed that determines CPU or processor load with respect to one or more CPUs of the data storage system. The CPU or processor load may be CPU or processor utilization with respect to one or more CPUs of the data storage system. From step 604, control proceeds to step 605. At step 605, processing is performed to determine the HW device load such as may be based on one or more factors or metrics. For example assessing and determining HW device load may include any of write cache fullness/level, HW device response time (RT), and/or read load. From step 605, control proceeds to step 606. At step 606, processing is performed to determine a compression level in accordance with one or more criteria. The one or more criteria may relate to load or workload conditions of the data storage system (e.g., as obtained in step 604) and/or HW device (e.g., as obtained in step 605). The one or more criteria may include any of CPU or processor load (e.g., as in step 604), write cache fullness/level, HW device response time (RT), and/or read load (e.g. as in step 605). The selected compression level may be one of multiple predefined compression levels. From step 606, control proceeds to step 608. At step 608, a request is sent from the data storage system to the HW device to compress the data chunk. From step 608, control proceeds to step 610. In step 610, the HW device performs processing that compresses the data chunk. From step 610, control proceeds to step 612. At step 612, the compressed form of the data chunk is transferred from memory of the HW device to memory, such as cache, of the data storage system. From step 612, control proceeds to step 614. At step 614, the compressed form of the data is written from the memory, such as the cache of the data storage system, to PDs of the data storage system providing backend non-volatile storage.

Figure 6B:
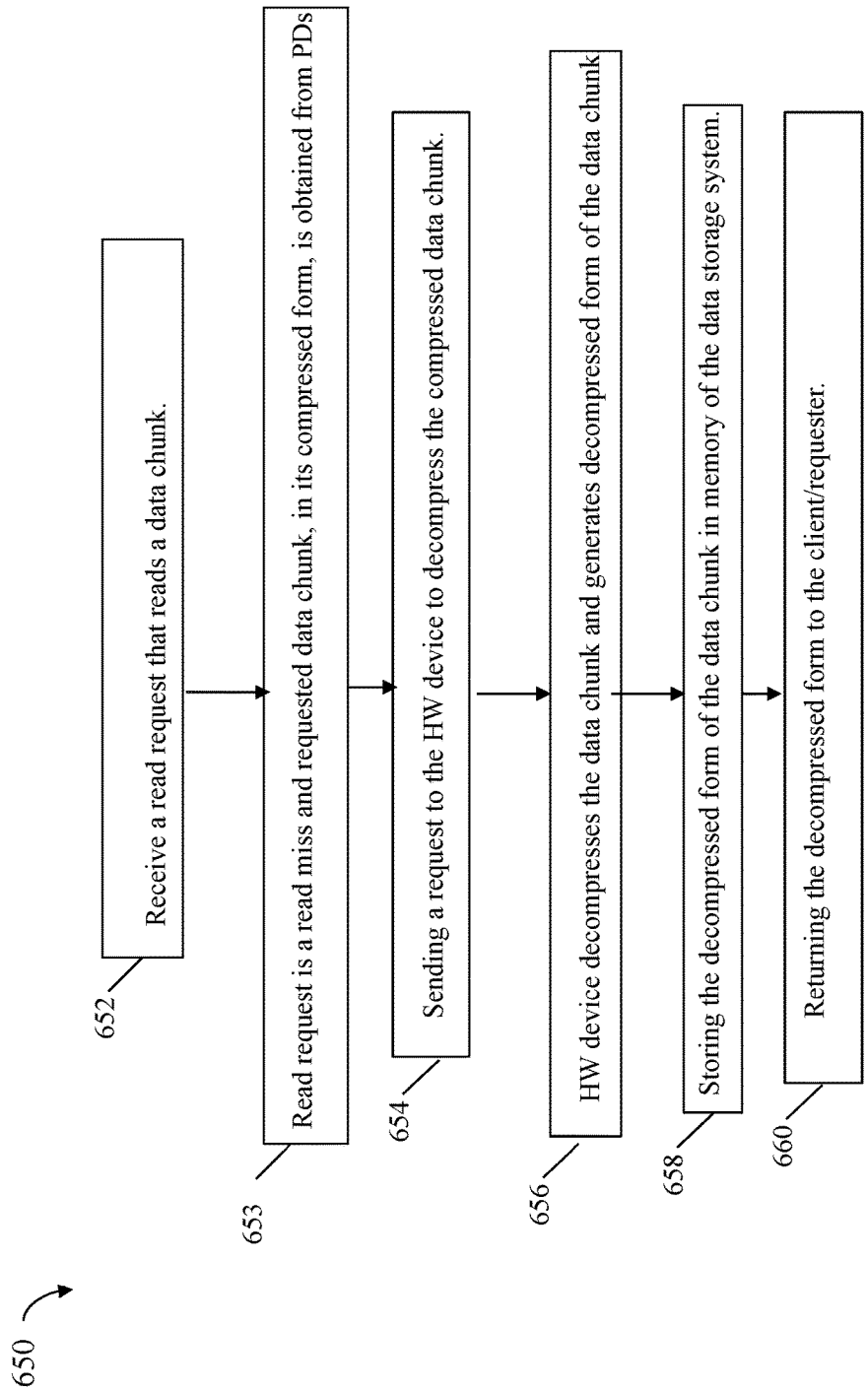

Referring to FIG. 6B, shown is a second flowchart 650 of processing steps that may be performed in an embodiment in accordance with techniques herein. In at least one embodiment, the steps of 650 may be performed as part the I/O path or data path, such as part of ILC processing. At step 652, a read request may be received that reads a data chunk. From step 652, control proceeds to step 653. Consistent with discussion herein, step 653 determines that the read request is a read miss where the requested read data is not stored in cache and is then retrieved from the backend non-volatile PDs and stored in cache in its compressed form. From step 653, control proceeds to step 654. At step 654, a request is sent to the HW device to decompress the compressed data chunk. From step 654, control proceeds to step 656 where the HW device decompresses the data chunk and generates a decompressed form of the data chunk. From step 656 to step 658, the decompressed data chunk is transferred from memory of the HW device to memory, such as cache, of the data storage system. From step 658, control proceeds to step 660. At step 660, the data storage system returns the decompressed data chunk stored in the cache to the client.

Figure 7:
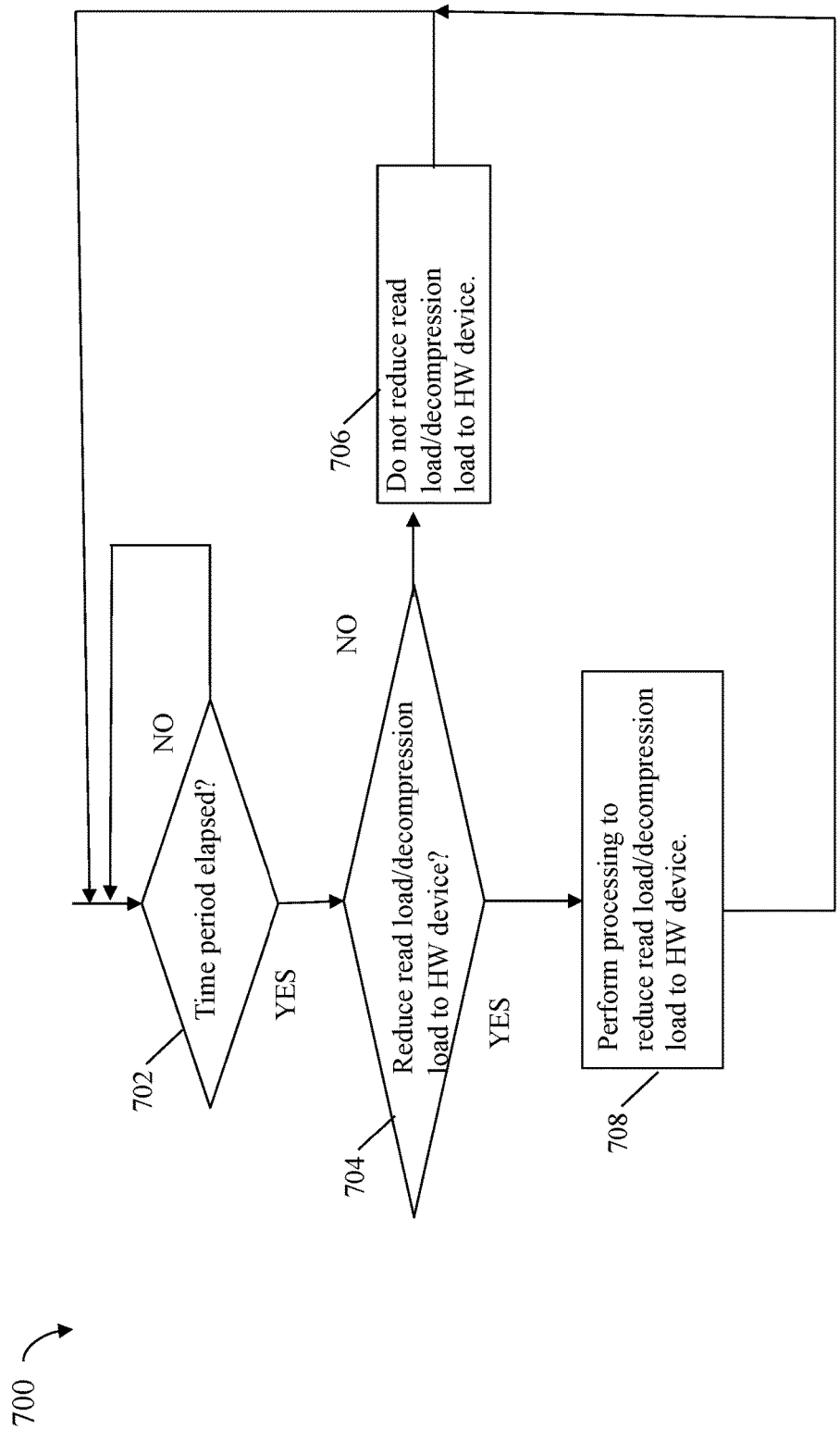

Referring to FIG. 7, shown is a third flowchart 700 of processing steps that may be performed in an embodiment in accordance with techniques herein. In at least one embodiment, the steps of 700 may be performed periodically. At step 702, a determination is made as to whether the next time period has elapsed. If no, control remains at step 702 until step 702 evaluates to yes. Upon determining that step 702 evaluates to yes, control proceeds to step 704 where a determination is made as to whether to reduce the read load or decompression load sent to the HW device. If step 704 evaluates to no, control proceeds to step 706 where the read load or decompression load to the HW device is not reduced and control proceeds to step 702. If step 704 evaluates to yes, control proceeds to step 708 where processing is performed to reduce the read load or decompression load to the HW device. From step 708, control proceeds to step 702.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of data processing comprising:
receiving, at a data storage system, a write operation that writes a data chunk;
selecting, in accordance with criteria related to load of a hardware device that compresses and decompresses data, a compression level to be used in connection with compressing the data chunk, wherein the criteria include a read load related to decompression requests sent to the hardware device, a measured response time of the hardware device denoting an amount of time it takes the hardware device to generate an output with respect to compression and decompression requests, and a current level of cache consumed for storing write data, and wherein the current level of cache consumed for storing write data indicates a write load of compression requests sent to the hardware device;
issuing a request to the hardware device to perform compression processing that compresses the data chunk in accordance with the compression level selected and generates a compressed form of the data chunk; and
storing the compressed form of the data chunk on a non-volatile storage device.

2. The method of claim 1, wherein the compression level is selected from a plurality of defined compression levels corresponding to providing a plurality of corresponding expected levels of compressibility.

3. The method of claim 2, wherein the plurality of compression levels has a first ranking denoting a relative ordering of the plurality of compression levels from a highest expected compressibility level to a lowest expected compressibility level.

4. The method of claim 3, wherein each of the plurality of compression levels is associated with one of a plurality of value ranges that indicates that said each compression level is selected in said selecting when the processor load denotes a value in the one value range specified for said each compression level.

5. The method of claim 4, wherein one of the plurality of compression levels ranked in the first ranking as having the highest expected compressibility level is selected when the processor load is included in a lowest one of the plurality of value ranges, and wherein another one of the plurality of compression levels ranked in the first ranking as having the lowest expected compressibility level is selected when the processor load is included in a highest one of the plurality of value ranges.

6. The method of claim 3, wherein the plurality of compression levels has a second ranking denoting a relative ordering of the plurality of compression levels from a highest expected computational intensity to perform compression to a lowest expected computational intensity to perform compression.

7. The method of claim 6, wherein the one of the plurality of compression levels ranked in the first ranking as having the highest expected compressibility level is also ranked in the second ranking as having the highest expected computational intensity, and wherein the another one of the plurality of compression levels ranked in the first ranking as having the lowest expected compressibility level is also ranked in the second ranking as having the lowest expected computational intensity.

8. The method of claim 7, wherein the plurality of compression levels has a third ranking denoting a relative ordering of the plurality of compression levels from a highest expected compression throughput to a lowest expected compression throughput.

9. The method of claim 8, wherein the one of the plurality of compression levels ranked in the first ranking as having the highest expected compressibility level and ranked in the second ranking as having the highest expected computational intensity is also ranked in the third ranking as having the lowest expected compression throughput, and wherein the another one of the plurality of compression levels ranked in the first ranking as having the lowest expected compressibility level and ranked in the second ranking as having the lowest expected computational intensity is also ranked in the third ranking as having the highest expected compression throughput.

10. The method of claim 2, wherein the criteria include processor load determined with respect to one or more processors of the data storage system, and wherein the processor load is measured as processor utilization.

11. The method of claim 2, wherein the hardware device includes at least one processor used to compress and decompress data provided as an input to the hardware device.

12. The method of claim 11, wherein the hardware device includes hardware accelerators to compress and decompress data provided as an input to the hardware device.

13. The method of claim 11, wherein the at least one processor of the hardware device is a co-processor used to offload compression and decompression processing from one or more processors of the data storage system, and wherein said co-processor performs said compression processing that compresses the data chunk in accordance with the compression level selected and generates the compressed form of the data chunk.

14. The method of claim 1, wherein the compression processing that compresses the data chunk in accordance with the compression level selected and generates the compressed form of the data chunk is performed inline as part of I/O path processing when writing the data chunk.

15. The method of claim 1, wherein the compression processing that compresses the data chunk in accordance with the compression level selected and generates the compressed form of the data chunk is not performed inline as part of I/O path processing when writing the data chunk.

16. A method of data processing comprising:
receiving, at a data storage system, a write operation that writes a data chunk;
selecting, in accordance with one or more criteria related to load of at least one of the data storage system and the hardware device, a compression level to be used in connection with compressing the data chunk;
issuing a request to a hardware device to perform compression processing that compresses the data chunk in accordance with the compression level selected and generates a compressed form of the data chunk;
storing the compressed form of the data chunk on a non-volatile storage device;
determining whether a current read load is above a first specified threshold, whether measured throughput of the hardware device is below a second specified threshold, and whether the compression level selected has an associated expected compression throughput that exceeds a third specified threshold; and
responsive to determining the current read load is above the first specified threshold, the measured throughput of the hardware device is below the second specified threshold, and the compression level selected has the associated expected compression throughput that exceeds the third specified threshold, performing processing that reduces a current rate at which decompressed data is sent to the hardware device for decompressing.

17. A system comprising:
at least one processor; and
a memory comprising code stored thereon that, when executed, performs a method of data processing comprising:
receiving, at a data storage system, a write operation that writes a data chunk;
selecting, in accordance with criteria related to load of a hardware device that compresses and decompresses data, a compression level to be used in connection with compressing the data chunk, wherein the criteria include a read load related to decompression requests sent to the hardware device, a measured response time of the hardware device denoting an amount of time it takes the hardware device to generate an output with respect to compression and decompression requests, and a current level of cache consumed for storing write data, and wherein the current level of cache consumed for storing write data indicates a write load of compression requests sent to the hardware device;
issuing a request to the hardware device to perform compression processing that compresses the data chunk in accordance with the compression level selected and generates a compressed form of the data chunk; and
storing the compressed form of the data chunk on a non-volatile storage device.

18. A non-transitory computer readable medium comprising code stored thereon that, when executed, performs a method of data processing comprising:
receiving, at a data storage system, a write operation that writes a data chunk;
selecting, in accordance with criteria related to load of a hardware device that compresses and decompresses data, a compression level to be used in connection with compressing the data chunk, wherein the criteria include a read load related to decompression requests sent to the hardware device, a measured response time of the hardware device denoting an amount of time it takes the hardware device to generate an output with respect to compression and decompression requests, and a current level of cache consumed for storing write data, and wherein the current level of cache consumed for storing write data indicates a write load of compression requests sent to the hardware device;
issuing a request to the hardware device to perform compression processing that compresses the data chunk in accordance with the compression level selected and generates a compressed form of the data chunk; and storing the compressed form of the data chunk on a non-volatile storage device.

19. A non-transitory computer readable medium comprising code stored thereon that, when executed, performs a method of data processing comprising:

receiving, at a data storage system, a write operation that writes a data chunk;

selecting, in accordance with one or more criteria related to load of at least one of the data storage system and the hardware device, a compression level to be used in connection with compressing the data chunk;

issuing a request to a hardware device to perform compression processing that compresses the data chunk in accordance with the compression level selected and generates a compressed form of the data chunk;

storing the compressed form of the data chunk on a non-volatile storage device;

determining whether a current read load is above a first specified threshold, whether measured throughput of the hardware device is below a second specified threshold, and whether the compression level selected has an associated expected compression throughput that exceeds a third specified threshold; and responsive to determining the current read load is above the first specified threshold, the measured throughput of the hardware device is below the second specified threshold, and the compression level selected has the associated expected compression throughput that exceeds the third specified threshold, performing processing that reduces a current rate at which decompressed data is sent to the hardware device for decompressing.

20. A system comprising:

at least one processor; and a memory comprising code stored thereon that, when executed, performs a method of data processing comprising:

receiving, at a data storage system, a write operation that writes a data chunk;

selecting, in accordance with one or more criteria related to load of at least one of the data storage system and the hardware device, a compression level to be used in connection with compressing the data chunk;

issuing a request to a hardware device to perform compression processing that compresses the data chunk in accordance with the compression level selected and generates a compressed form of the data chunk;

storing the compressed form of the data chunk on a non-volatile storage device;

determining whether a current read load is above a first specified threshold, whether measured throughput of the hardware device is below a second specified threshold, and whether the compression level selected has an associated expected compression throughput that exceeds a third specified threshold; and responsive to determining the current read load is above the first specified threshold, the measured throughput of the hardware device is below the second specified threshold, and the compression level selected has the associated expected compression throughput that exceeds the third specified threshold, performing processing that reduces a current rate at which decompressed data is sent to the hardware device for decompressing.

* * * * *